United States Patent [19]

Katoh

[11] Patent Number: 5,305,313

[45] Date of Patent: Apr. 19, 1994

[54] ELECTRONIC SWITCHING SYSTEM FOR USE IN CONNECTION TO AN ISDN AND METHOD OF SETTING COMMUNICATION DISCONNECTION REASONS

[75] Inventor: Hitoshi Katoh, Kawasaki, Japan

[73] Assignee: Kabushiki Kaisha Toshiba, Kawasaki, Japan

[21] Appl. No.: 908,371

[22] Filed: Jul. 6, 1992

[30] Foreign Application Priority Data

Jul. 4, 1991 [JP] Japan .................................. 3-164663

[51] Int. Cl.⁵ ........................................... H04L 12/12
[52] U.S. Cl. .................... 370/62; 370/110.1; 379/257
[58] Field of Search ...................... 370/60.1, 62, 110.1, 370/119; 379/100, 157, 165, 188, 196, 197, 201, 257

[56] References Cited

U.S. PATENT DOCUMENTS

| | | | |
|---|---|---|---|
| 4,969,182 | 11/1990 | Ohtsubo et al. | 379/197 |
| 4,975,900 | 12/1990 | Murata et al. | 370/110.1 |
| 4,985,887 | 1/1991 | Mizuhara et al. | 370/60 |
| 5,166,975 | 11/1992 | Maei | 370/110.1 |

Primary Examiner—Benedict V. Safourek
Attorney, Agent, or Firm—Finnegan, Henderson, Farabow, Garrett & Dunner

[57] ABSTRACT

An electronic switching system having ISDN interfaces on the extension side stores in a table the attributes of a terminal under communication using the ISDN interface. When there is another incoming call to the ISDN interface, the system waits for a response to the incoming call by the terminals connected to the ISDN. When no response is received, the switching system creates a disconnection reason message on the basis of the result of checking the terminal attributes in the table against the attributes of the incoming call. This disconnection reason message is then communicated to the calling terminal.

11 Claims, 9 Drawing Sheets (TERMINALS A,C,D HAVE SAME ATTRIBUTE)

FIG. 4

| ISDN INTERFACE | CHANNEL | TERMINAL ATTRIBUTE INFORMATION |
|---|---|---|
| A | B1 | LOWER LAYER MATCHING |
| A | B2 | HIGHER LAYER MATCHING |
| B | B1 | |
| B | B2 | |
| ... | ... | ... |
| L | B1 | |
| L | B2 | |

ELECTRONIC SWITCHING SYSTEM FOR USE IN CONNECTION TO AN ISDN AND METHOD OF SETTING COMMUNICATION DISCONNECTION REASONS

BACKGROUND OF THE INVENTION

1. Field of the Invention

The present invention relates to an electronic switching system having on the extension side an ISDN interface for connecting terminals to the ISDN, and more particularly to an apparatus and a method of setting a reason of disconnecting a communication line when the terminals connected to the ISDN interface do not respond to an incoming call to the ISDN interface.

2. Description of the Related Art

With ISDN now being widely used, electronic switching systems capable of being connected to the ISDN have been developed.

One example of such electronic switching systems is provided with ISDN interfaces both on the ISDN side and the extension side. A plurality of ISDN terminals can be connected to each of the ISDN interfaces on the extension side.

In the electronic switching system of this type, when there is an incoming call to an extension-side ISDN interface, the switching system sends a call setting message to an ISDN terminal connected to the extension-side ISDN interface to inform the terminal of the arrival of the incoming call in accordance with the procedures of the ISDN protocol.

Then, the electronic switching system monitors the generation of a response signal to the call setting message at the called ISDN terminal.

When no response signal is generated at the called ISDN terminal within a predetermined time, the electronic switching system outputs a message including a disconnecting reason indicating that there is no response to the calling terminal.

When non-coincidence of attributes is indicated by the called ISDN terminal, the switching system outputs to the calling terminal a message including the reason indicating that attributes of the terminals do not coincide with each other.

According to the above-described disconnection message setting, when an ISDN terminal is under communication and a calling terminal having the same attributes as the ISDN terminal under communication places a new call to an ISDN interface to which the ISDN terminal is connected, the terminal under communication cannot respond to the new call.

Therefore, the electronic switching system outputs to the calling terminal a message to the effect that there is no response, which correctly indicates the situation on the called side.

However, when a plurality of ISDN terminals are connected to the extension-side ISDN interface and when there is an incoming call to one of the ISDN terminals which does not respond to the incoming call, another one of the ISDN terminals may instead respond to that call.

Under that situation, if another ISDN terminal which has a different attribute from the first one of the ISDN terminals responds to an incoming call and sends to the interface a disconnection signal indicative of non-coincidence of attributes because the first terminal cannot respond to the call, the switching system inform the calling terminal of a disconnection reason indicating that the attribute of the calling terminal does not coincide with that of the called terminal.

Although there are some terminals which have the same attribute as the calling terminal in the extension-side ISDN interface and the system can respond to the calling terminal when the on-going communication is over, a wrong message indicative of "non-coincidence of attributes" is sent to the calling terminal. As a result, a user of the calling terminal may think that calling to the terminal is useless.

As described above, in the conventional electronic switching system in which a plurality of ISDN terminals are connected to an extension-side ISDN interface, when an appropriate ISDN terminal cannot correctly respond to an incoming call to the extension-side ISDN interface, a reason for disconnection is created on the basis of the response by the called ISDN terminal and is sent to the calling terminal.

Therefore, if there is another communication channel in the ISDN interface through which a terminal is under communication whose attribute is the same as that of the calling terminal, it is impossible to correctly inform the calling terminal that the reason that it could not respond to the incoming call was because the terminal having the same attribute as the calling terminal is under communication.

When the terminal under communication having the same attribute as the calling terminal completes its communication, it can respond to a retry by the calling terminal. However, the calling terminal may not redial because of the wrong message of "non-coincidence of attributes" and as a result, the reliability of the communication using the switching system is impaired.

SUMMARY OF THE INVENTION

Accordingly, it is an object of the present invention to provide an electronic switching system capable of informing a calling terminal of a correct reason for disconnection which reflects the operational state of the terminals connected to the called ISDN interface.

It is another object of the present invention to provide an electronic switching system capable of preventing abandonment of communication due to wrong recognition such as non-coincidence of attributes by the calling terminal which was incorrectly informed of the reason for disconnection.

It is still another object of the present invention to provide an electronic switching system capable of correctly informing the calling terminal that there is a terminal in the called side which has the same attributes as the calling terminal but cannot correspond with the calling terminal because the called terminal is under communication, and allowing the calling terminal to redial the called terminal later to thereby provide a chance for the called terminal to respond to an incoming call.

It is a further object of the present invention to provide an disconnection reason setting method which causes a called ISDN interface to inform the calling terminal of a correct reason why the called ISDN interface cannot respond to the incoming call and urges redialing if there is a terminal in the ISDN interface which has the same attribute as the calling terminal so as to achieve a desired communication to thereby improve the reliability of facsimile communication.

In order to achieve the above objects, the present invention provides an electronic switching system comprising an ISDN interface provided on an extension side of the system and including a plurality of channels to which a plurality of ISDN terminals are connected, means for extracting the attribute of a terminal under communication by using one of the plurality of channels of the ISDN interface, means for storing the attribute of the terminal extracted by the extracting means with respect to the channel used by that terminal, means for creating a disconnection reason message indicative of the reason that a terminal connected to the ISDN interface is unable to respond to an incoming call to a channel of the ISDN interface on the basis of the result of checking of the attribute of the calling terminal and the attribute of a communication terminal stored in the terminal attribute storing means, and means for informing the calling terminal of the disconnection reason message created by the disconnection reason creating means.

In order to achieve the above objects, the present invention also provides a method of setting a disconnection reason by an electronic switching system, comprising the steps of extracting the attribute of a terminal in connection with a channel under communication of a plurality of channels of the ISDN interface to which a plurality of ISDN terminals are connected as extension terminals, storing in a table the attribute of the extracted terminal in correspondence to the channel used by the terminal, creating a disconnection reason indicative of the reason that a terminal connected to the ISDN interface is unable to respond to an incoming call to a channel of the ISDN interface on the basis of the result of checking the attributes of the calling terminal which has brought the incoming call for those of the communicating terminals stored in the table, and informing the calling terminal of the disconnection reason message.

BRIEF DESCRIPTION OF THE DRAWINGS

FIG. 4 illustrates a terminal attribute table used for an disconnection reason setting operation of the electronic switching system;

DESCRIPTION OF THE PREFERRED EMBODIMENT

Embodiments of the present invention will be described in detail with reference to the accompanying drawings.

Figure 1:
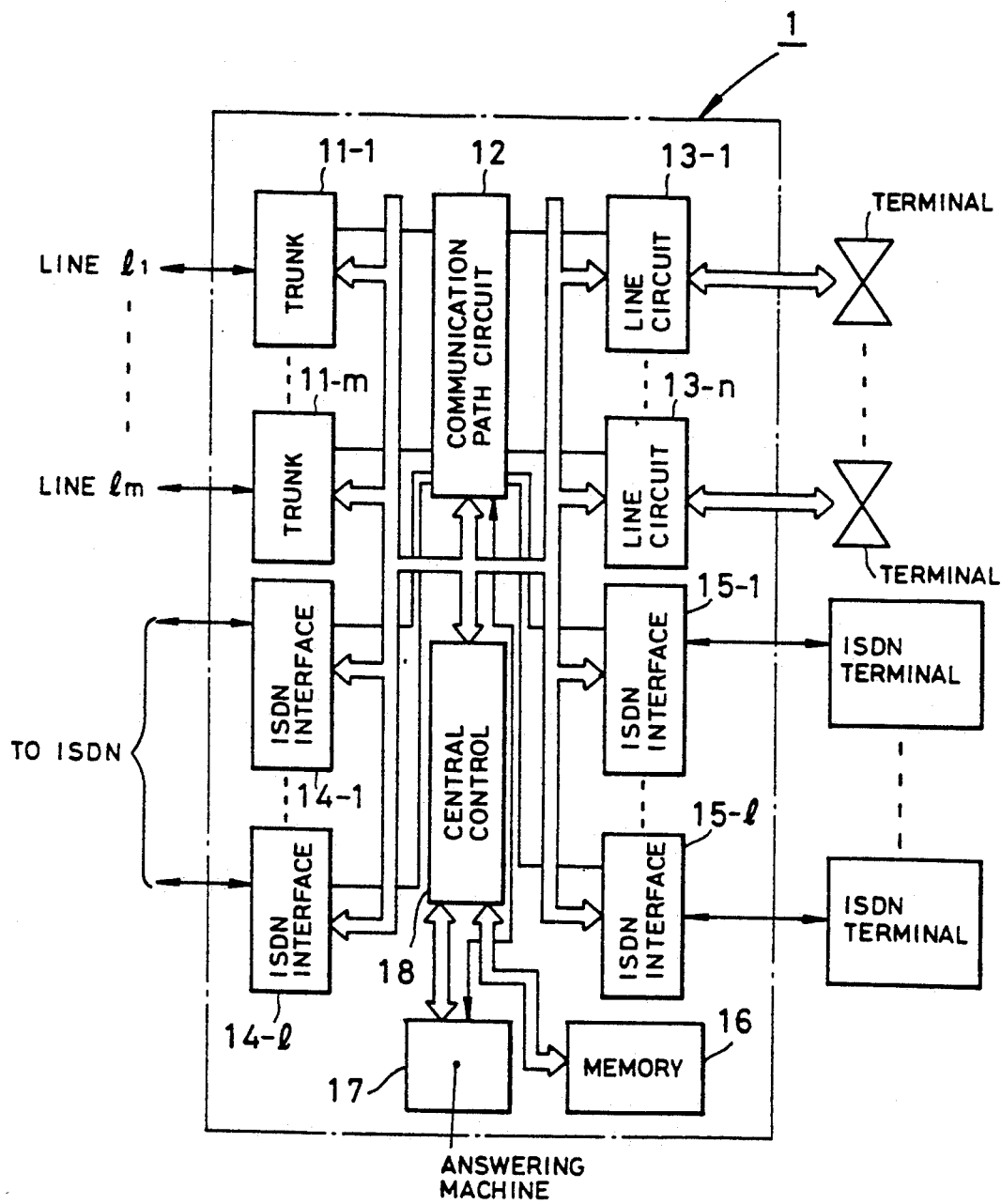
FIG. 1 is a block diagram of an electronic switching system according to an embodiment of the present invention.

Referring to FIG. 1, an electronic switching system 1 includes trunk circuits 11-1, ..., 11-m, a communication path circuit 12, line circuits 13-1, ..., 13-n, network-side ISDN interfaces 14-1, ..., 14-l, extension-side ISDN interfaces 15-1, ..., 15-l, a memory 16, an answering machine 17, and a central control circuit 18.

Figure 2:
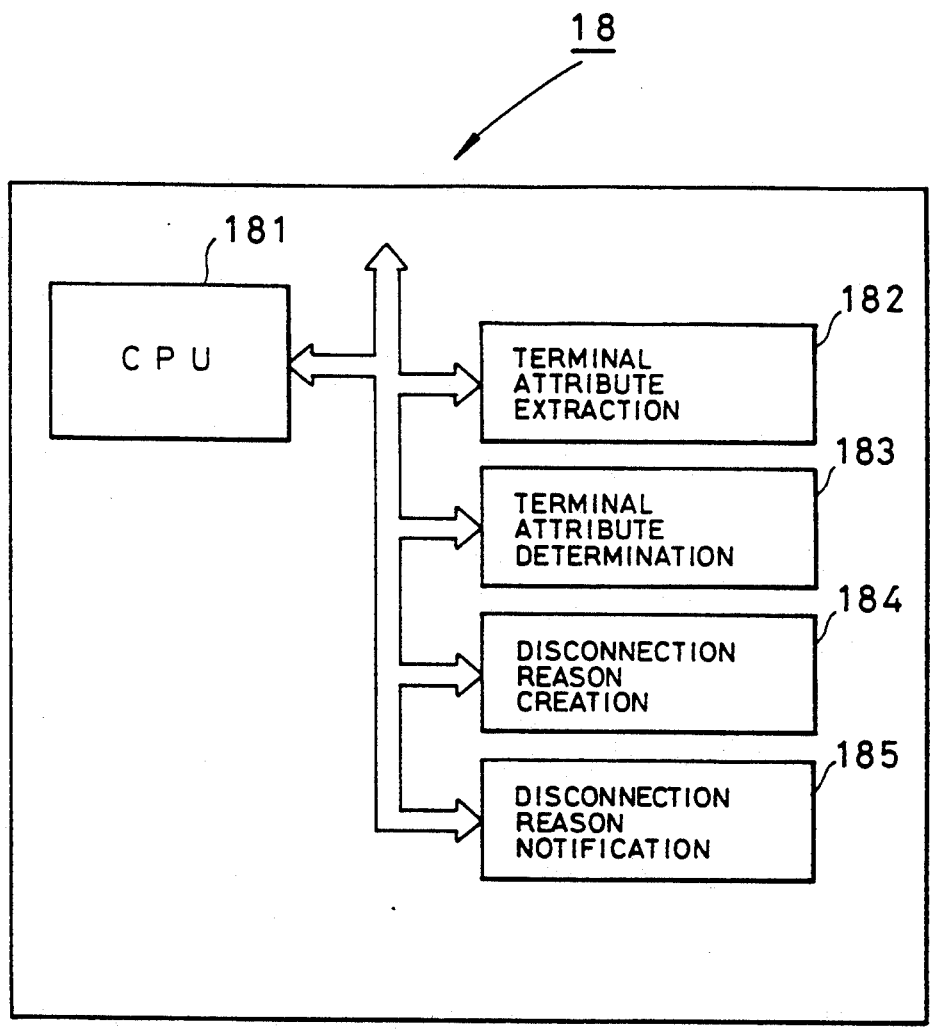
FIG. 2 is a block diagram illustrating a structure of a central control circuit of the electronic switching system.

Referring to FIG. 2, the central control circuit 18 comprises a terminal attribute extraction unit 182, a terminal attribute determination unit 183, an disconnection reason message creation unit 184, a disconnection reason message informing unit 185, and a CPU 181 which controls these elements systematically.

In the electronic switching system 1 of FIG. 1, up to 8 ISDN terminals can be connected to the ISDN interfaces 15-1, ..., 15-l provided on the extension side of the system.

The ISDN terminals connected to the ISDN interfaces 15-1, ..., 15-l are, for example, terminals each having different attributes such as a telephone set and a G4 facsimile device.

The electronic switching system 1 includes, for example, network-side ISDN interfaces 14-1, ..., 14-l corresponding to the extension-side ISDN interfaces 15-1, ..., 15-l.

Figure 3:
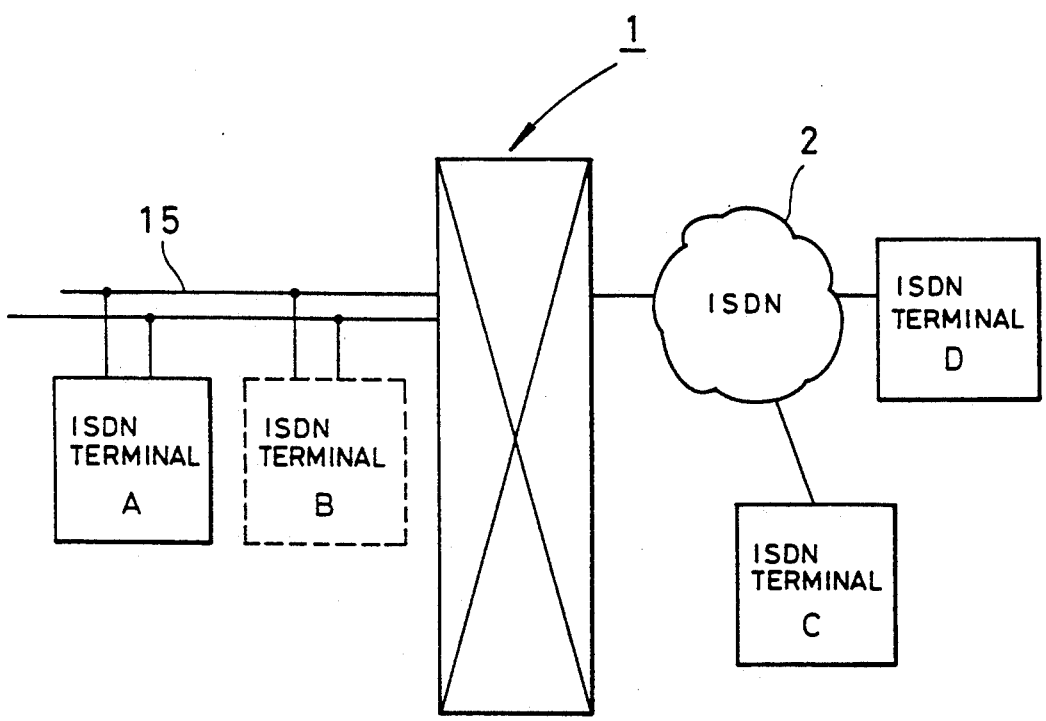
FIG. 3 shows a system structure of an example of an ISDN switching network including the electronic switching system of FIG. 1.

With such arrangement, the ISDN switching network shown in FIG. 3 is realized in which the electronic switching system 1 is connected to an ISDN network 2 through the network-side ISDN interfaces 14-1, ..., 14-l.

In the ISDN switching network, ISDN terminals A and B each having different attributes are connected to the switching system 1 through an ISDN interface 15 which is one of the extension-side ISDN interfaces 15-1, ..., 15-l.

ISDN terminals C and D are connected to the ISDN network 2. The ISDN terminals C and D have the same attributes as the ISDN terminal A. In FIG. 3, the terminal B has a different attribute from other terminals A, C and D.

In the switching system thus constructed, when there is an incoming call to the interface 15 from the terminal D, and the terminal A or B does not respond to the incoming call, the switching system creates a message indicative of a reason for disconnection through procedures to be described later, informs the calling terminal D of the message and then disconnects the line.

Referring to FIG. 1, the inventive method of creating a disconnection reason message in the switching system 1 and sending it to the calling terminal will be outlined.

According to this method, when an ISDN terminal connected to any one of the extension side ISDN interfaces 15-1, ..., 15-l is under communication, data on the attributes of the terminal under communication are stored on a terminal attribute table. When there is another incoming call to the same ISDN interface to which any terminal cannot respond and therefore a disconnection reason message is sent to the calling terminal, the attribute of the terminal under communication stored on the terminal attribute table is checked and a disconnection reason message is created on the basis of the result of the checking.

The terminal attribute table may be provided in the memory 16 of FIG. 1.

FIG. 4 illustrates one example of the terminal attribute table which stores data on ISDN interfaces 15-1 (A), . . . , 15-l (L), data on two B (communication) channels B1 and B2 and one D (control) channel provided for each of ISDN interfaces 15-1 (A), . . . , 15-l (L), and data on the attribute of a communication terminal under communication through those channels.

In the terminal attribute table, lower layer matching characteristics and higher layer matching characteristics are used as data on terminal attributes.

The respective data items on the lower and higher layer matching characteristic can be extracted from a call setting message of an ISDN communication protocol which is executed when a terminal places a call through one of ISDN interfaces 15-1, . . . , 15-l or when there is an incoming call to one of the ISDN interfaces 15-1, . . . , 15-l.

Figure 5:
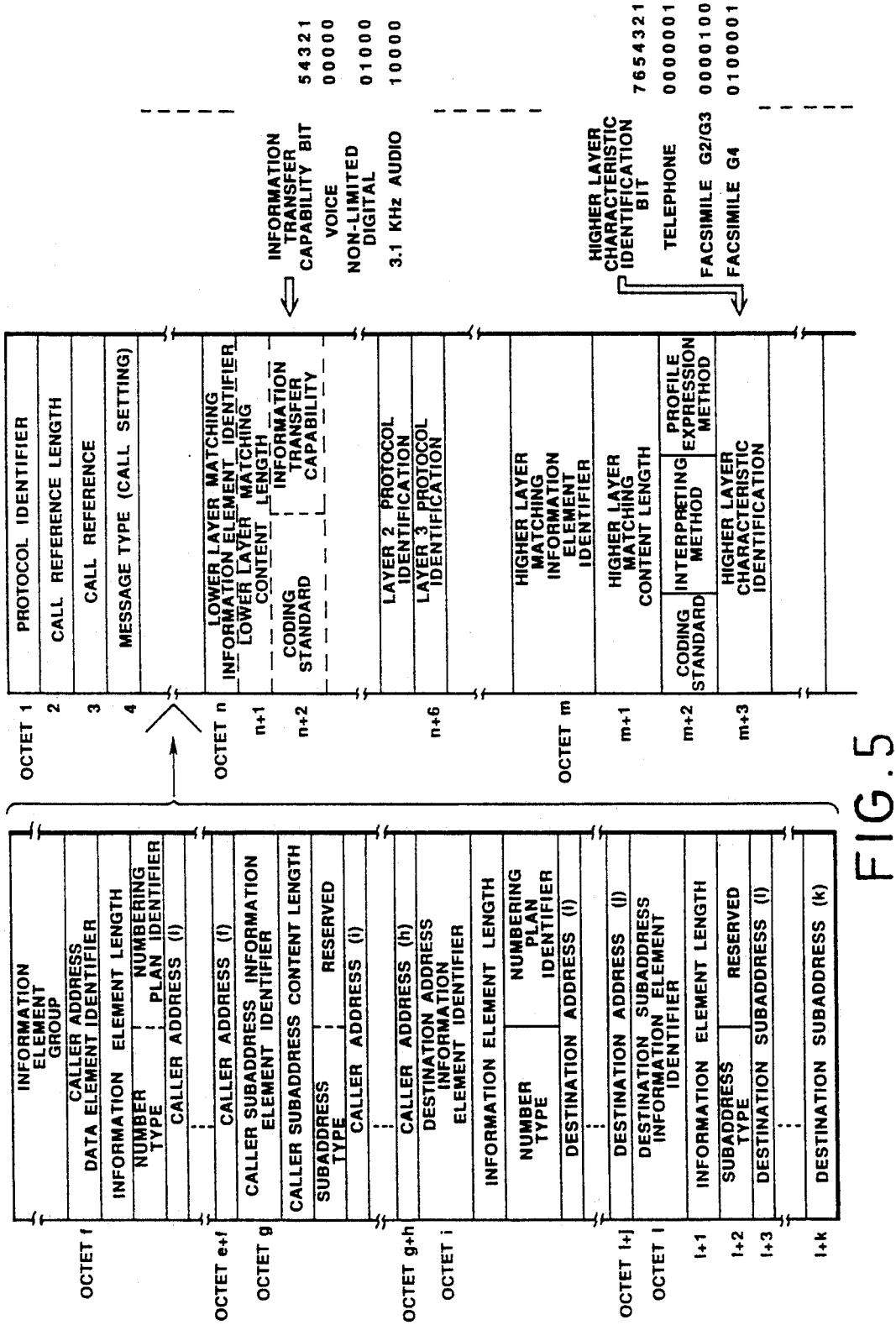
FIG. 5 illustrates an example of a call setting message used in an ISDN communication protocol.

FIG. 5 shows a typical structure of a call setting message of this type specified in the ISDN communication protocol.

As shown in FIG. 5, the call setting message comprises information elements such as a calling terminal identification data (calling address data element identifier: octet f) and called terminal identification data (called address information element identifier: octet i).

The lower layer matching information element group (octet n to n+6) includes information indicative of information transfer capability such as audio, non-limited digital and 3.1 KHz audio, and the higher layer matching information element group (octet m to m+3) includes terminal attribute information such as G2/G3 facsimile and G4 facsimile.

The switching system 1 extracts data on the attributes of the calling terminal from the lower and higher layer matching information of the call setting message received from the network when there is an incoming call to one of the ISDN interfaces 15-1, . . . , 15-l and stores them in the terminal attribute table.

Further, when one of the ISDN terminals connected to the extension-side ISDN interfaces 15-1, . . . , 15-l places a call, the switching system extracts the attributes of the calling terminal from the lower and higher layer matching information of the call setting message and stores them in the terminal attribute table.

When there is an incoming call to the ISDN interfaces 15-1, . . . , 15-l to which a terminal under communication is connected and the incoming call is not responded to, the switching system checks the stored contents of the terminal attribute table for each of the interfaces 15-1, . . . , 15-l and creates a reason for disconnection in accordance with the result of the checking.

As just described above, according to the present invention, there is provided the terminal attribute table which stores lower or higher layer matching information contained in the call setting message of the communication protocol for each channel of the extension-side ISDN interfaces 15-1, . . . , 15-l as terminal attributes. The data in the terminal attributes is stored on the table from the time when the call starts the communication to the time when the communication ends.

When there is another incoming call to the extension-side ISDN interface during communication and there is no response from any terminal connected to the ISDN interface within a predetermined time, or when information indicative of non-coincidence of attributes is sent, the switching system 1 checks whether there is another channel which is now under communication in the ISDN interface. If there is another channel, the attribute of the terminal under communication is found in the terminal attribute table, and the attribute of the terminal under communication is compared with that of the calling terminal.

If the switching system determines the coincidence of both the terminal attributes, it creates a reason indicating a "busy state" and sends it on a disconnection message to the calling terminal.

If the switching system determines non-coincidence of the terminal attributes, it creates a reason indicating the "non-coincidence of attributes" and sends it as a disconnection message to the calling terminal.

Call control operation by the switching system 1 which includes creation of the disconnection messages will be illustrated with reference to the flowchart of FIG. 6.

This operation is controlled by the central control circuit 18 of the switching system 1. The central control circuit 18 monitors any incoming call to the extension-side ISDN interface 15 by using a CPU 181 (S101).

When there is an incoming call, the terminal attribute extraction unit 182 extracts the attributes of the calling terminal from the lower or higher layer matching information of a call setting message (FIG. 5) which is sent from ISDN network 2 when the incoming call is received and stores data on the attributes of the calling terminal into the terminal attribute table (FIG. 4) (S102).

As mentioned above, the table may be provided in the memory 16 of the switching system 1.

Thereafter, the CPU 181 of the central control circuit 18 informs the called terminal of the incoming call and monitors whether the called terminal has responded to the incoming call (S103).

When the called terminal responds to the incoming call, the CPU 181 immediately connects the called terminal to an incoming signal line (S104) and brings the incoming line into communication (S105).

The CPU 181 continuously monitors whether the communication has ended (S106). When the communication ends, the CPU 181 erases the terminal attribute information stored for this communication from the terminal attribute table (S107) and simultaneously disconnects the line (S113).

At step S103, when the called terminal does not responds to the incoming call for a certain interval of time, the terminal attribute determination unit 183 of the central control circuit 18 checks the terminal attributes stored on the terminal attribute table for other communications continuing at that time (S108).

More specifically, the terminal attribute determination unit 183 checks whether there are any terminal attributes coincident with those of the calling terminal stored in the terminal attribute table (S109). Thereafter, the disconnection reason message creation unit 184 creates a disconnection reason message to be described later in accordance with the result of the determination (S110, 111).

For example, when the determination unit 183 determines that there is the same attribute in the table at step S109, the message creation unit 184 creates a disconnection reason message indicative of "busy state" (S110).

When the determination unit 183 determines that there is not the same attribute at step S109, the message creation unit 184 creates a disconnection reason message indicative of non-coincidence of attributes (S111).

Thereafter, the disconnection reason message informing unit 185 sends the message created at step S110 or S111 to the calling terminal (S112). Then, the CPU 181 disconnects the line (S113).

According to a conventional call controlling method, a disconnection reason message is created without checking the terminal attributes. Therefore, if there is a response indicative of non-coincidence of attributes from a terminal even when another terminal having the same attributes as the calling terminal is busy and cannot respond to the incoming call, the calling terminal is informed that disconnection reason is the non-coincidence of attributes.

Therefore, the calling terminal which has received such notification would give up re-dialing on the basis of the determination that there are no terminals which have attributes coincident with those of the calling terminal. Thus, even if there is a terminal having the same attributes as the calling terminal and the terminal of the same attributes can respond to the incoming call after the communication has ended, the calling terminal would give up communication, thus lowering the quality of service.

Figure 6:
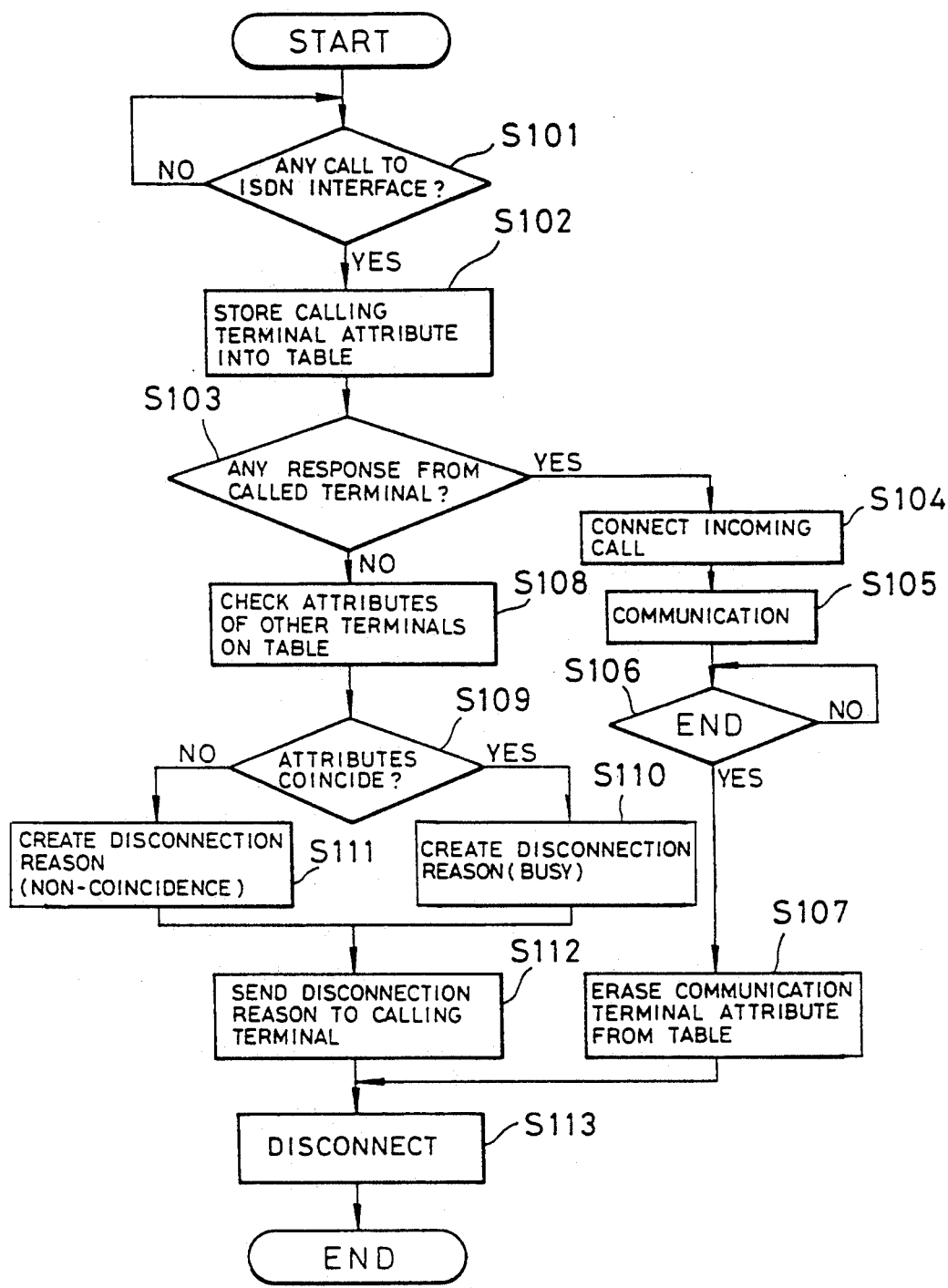
FIG. 6 is a flowchart illustrating an example of call control provided by the electronic switching system to which control of the inventive disconnection reason setting method is applied when an incoming call is received.

According to the present invention, by performing the operations at S102, S108 and S109 of FIG. 6, even in the above situation, a disconnection reason message indicative of "busy state" is created to thereby correctly inform the calling terminal at the situation of the called side even if the incoming call is not responded to because the terminal having the same attributes as the calling terminal is under communication.

The calling terminal is informed for reason of the disconnection by a message that the called terminal is busy. Therefore, the calling terminal may try re-dialing until the incoming call is responded to, thereby improving the reliability of the communication.

In the call control described above, the terminal attributes are checked (S108) when there is no response from the called terminal at step S103 of FIG. 6. However, the present invention is not limited to such control. Even if the calling terminal is informed of non-coincidence of attributes by a terminal in the ISDN interface 15 to which the incoming call arrived, it may be so designed that the terminal attributes are checked as in the case where there is no response, and then the operation proceeds to the disconnection reason setting operation.

FIG. 6 shows the case in which the extraction of the terminal attributes and storage of them in the terminal attribute table are performed when there is an incoming call. These operations can also be performed when an ISDN terminal connected to the ISDN interface 15 places a call.

Figure 7:
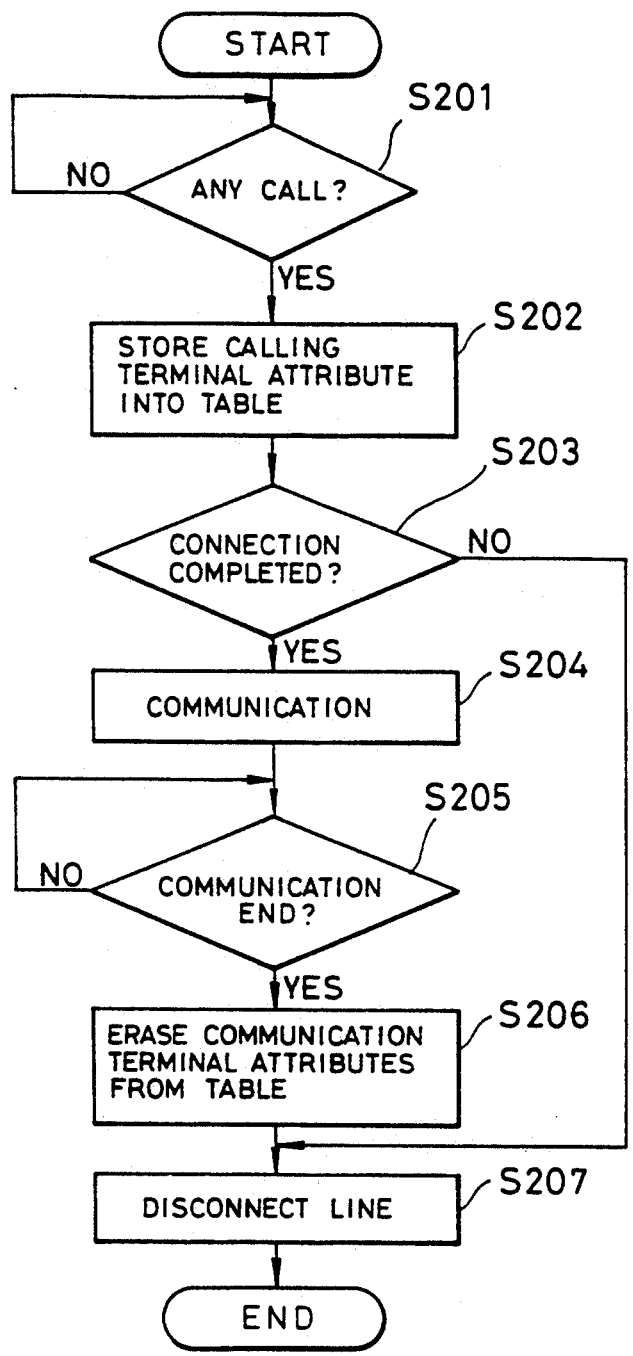
FIG. 7 is a flowchart illustrating an example of call control provided by the switching system to which control the inventive disconnection reason setting method is applied when a call is placed.

One example of extraction of the attributes of the calling terminal performed in the calling operation and storage of these attributes in the terminal attribute table during the communication by the calling terminal will be described with reference to the flowchart of FIG. 7.

The CPU 181 monitors whether there is an outgoing call from an ISDN terminal connected to the extension-side ISDN interface 15 (S201). When there is an outgoing call, the terminal attribute extraction unit 182 monitors the ISDN communication protocol between the calling terminal and the called terminal, and extracts the attributes of the calling terminal from the lower or higher layer matching information of the call setting message (see FIG. 5) in the protocol so as to store them in the terminal attribute table (FIG. 4) (S202).

Then, the CPU 181 determines whether the calling terminal is in connection to the called terminal through the ISDN communication protocol (S203). If so, the CPU 181 establishes communication therebetween (S204).

Subsequently, the CPU 181 monitors whether the communication has ended (S205). If so, the CPU 181 erases from the terminal attribute table the data on the terminal attributes stored in the table in correspondence to this communication (call origination) (S206) and simultaneously disconnects the line (S207).

One example of communication procedures performed in the ISDN exchange network of FIG. 3 in accordance with the inventive disconnection setting method will be described with reference to FIGS. 8 and 9.

Figure 8:
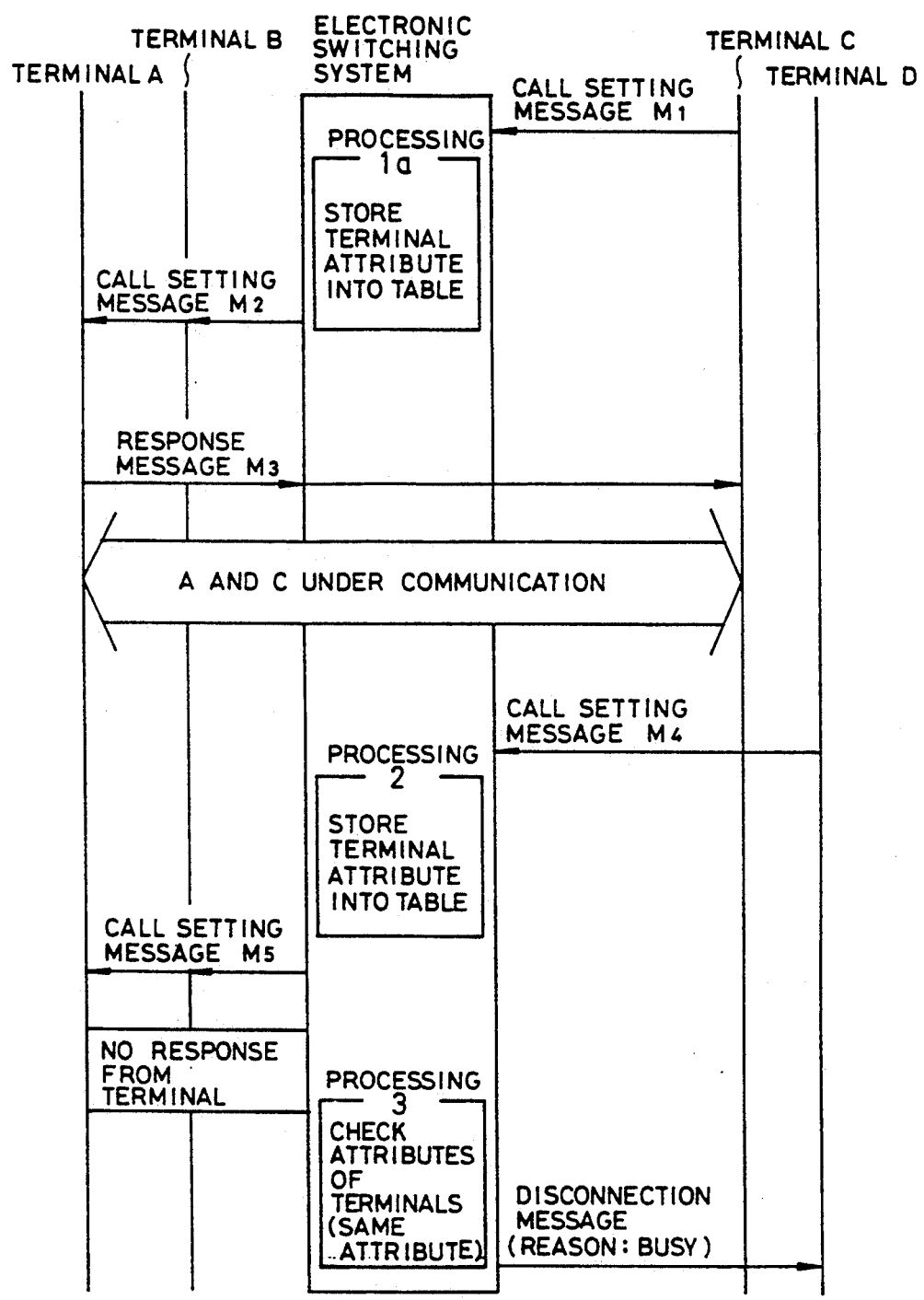
FIG. 8 illustrates an example of communication procedures used in an ISDN exchange network including the electronic switching system, to which procedures the inventive disconnection reason setting method is applied.
Figure 9:
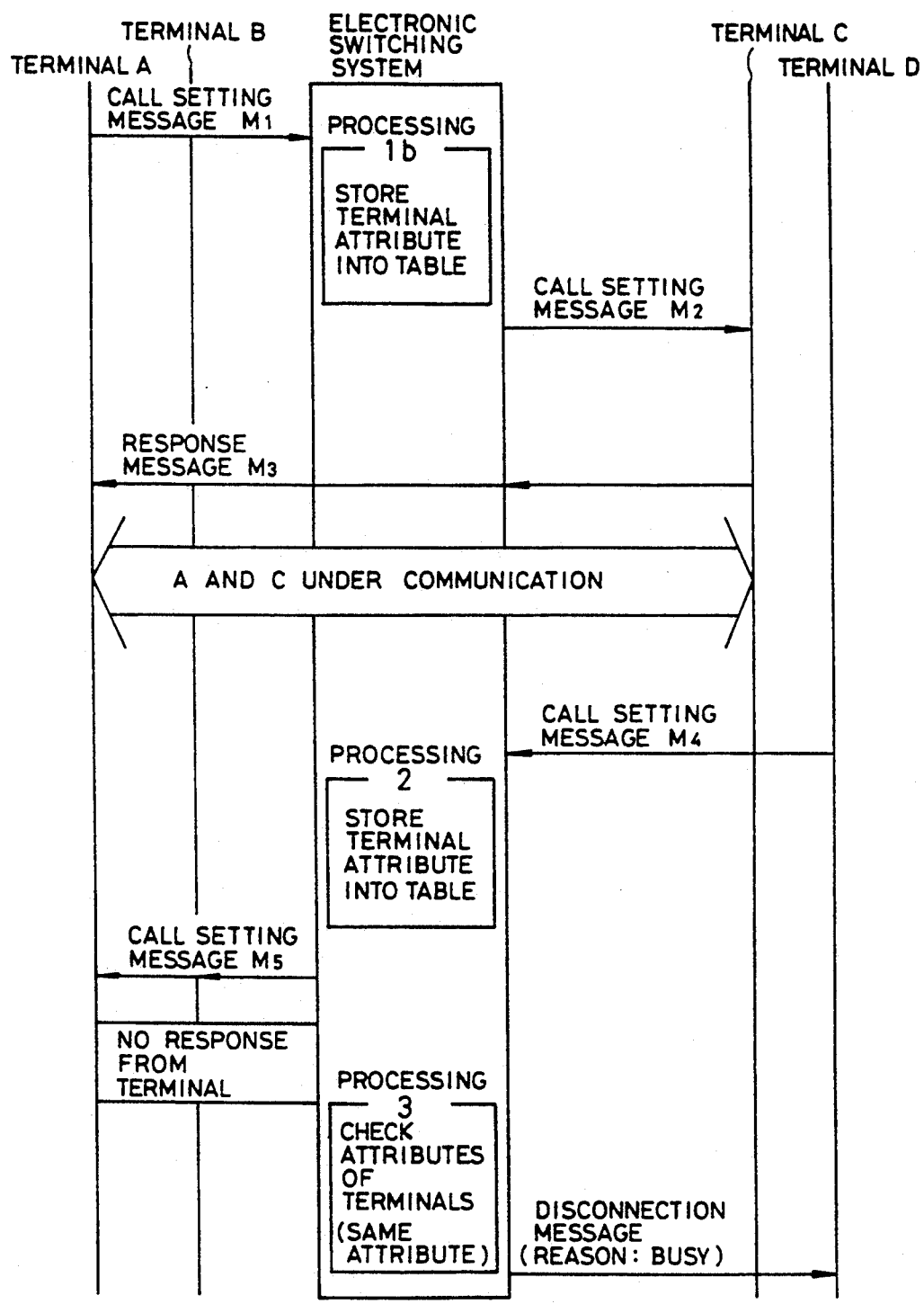
FIG. 9 illustrates another example of communication procedures in an ISDN switching network including the electronic switching system, to which procedures the inventive disconnection reason setting method is applied.

FIG. 8 shows the communication procedures for informing ISDN terminal D of a disconnection reason when there is an incoming call from the terminal D to the ISDN interface 15 in the situation where an incoming call from the ISDN terminal C of the ISDN network 2 to the extension-side ISDN interface 15 has already established communication between the ISDN terminals D and A.

In the communication procedures, the terminal C sends a call setting message M1 to the switching system 1 through the ISDN network 2 for calling purposes.

The switching network 1 stores in the terminal attribute table the terminal attribute information extracted from particular information (lower or higher layer matching) of the call setting message M1 received from the ISDN terminal C (processing 1a, corresponding to step S102 of FIG. 6), and sends a call setting message M2 to an appropriate extension-side ISDN interface 15 for receiving purposes.

When the terminal A sends to the switching system 1 a message M3 responsive to the call setting message M2, the switching system 1 sends a responsive message M3 to the terminal C through the network 2. Thus, the terminal A is put into communication with the terminal C.

During the communication, the terminal D sends a call setting message M4 for call origination to the extension-side ISDN interface 15 having the channel under communication through the network 2.

The switching system 1 extracts the data on the terminal attributes from the particular data of the call setting message M4 received from the terminal D and records it in the table (processing 2, corresponding to the processing at step S102 of FIG. 6), and sends a call setting message M5 for receiving purposes to an extension-side ISDN interface 15 of the channel under communication.

The switching system 1 continues to monitor whether there is a response from the extension-side ISDN interface 15.

According to the conditions of the terminal attributes of the ISDN network exchange network of FIG. 3, the terminal B cannot respond to an incoming call from the terminal D even if the terminal B is idle because the terminal B has a terminal attribute different from that of the calling terminal D.

As described above, when there is no response from the terminals on the called side, the switching system 1 checks the terminal attributes of the terminal C (or A) under communication and stored on the terminal attribute table at processing 1a for the terminal attributes of the terminal D stored on the terminal attribute table at processing 2. In this embodiment, the switching system confirms the same terminal attributes (processing 3, corresponding to the flow including steps S108, 109 and S110).

At this time, the switching system 1 sends a disconnection message M6 indicative of "busy state" to the terminal D in the network 2. Thus, the terminal D recognizes that the called terminal is busy as indicated in the received message M6.

Therefore, the calling terminal D can have the chance to redial the called party later when the ISDN terminal having the same attributes as the caller becomes idle, thereby ensuring the desired communication.

The switching system 1 may include an answering machine 17 (FIG. 1) as an additional circuit. When the switching system 1 sends a disconnection message M6 to the terminal D, the answering machine 17 may send a voice message corresponding to the message M6.

Assume that there is an incoming call from the terminal D of the network 2 to the ISDN interface 15 under the situation where the terminal C of the network 2 is in communication with the terminal A of the extension-side ISDN interface 15 as a result of the terminal A calling the terminal C. The procedures for informing the terminal D of the disconnection reason in this case will be described with reference to FIG. 9.

In these communication procedures, first, terminal A sends a call setting message M1 for calling purposes to the switching system 1 through the extension-side ISDN interface 15.

The switching system 1 stores in the terminal attribute table the data on the terminal attributes extracted from the particular data (lower or higher layer matching) in the call setting message M1 received from the interface 15 (processing 1b, corresponding to step S202 of FIG. 7) and sends a call setting message M2 for receiving purposes to the called terminal C through the network 2.

The terminal C sends a message M3 responsive to the message M2 to the switching system 1. When the switching system 1 receives the message M3, it sends a response message M3 to the terminal A through the extension-side ISDN interface 15. Thus, the terminals A and C are brought into communication with each other.

During the communication, the terminal D further sends a call setting message M4 for calling purposes to the interface 15 having the channel under communication in the switching system 1 through the network 2.

The switching system 1 extracts the data on the terminal attributes from the particular data of the call setting message M4 received from the terminal D and records it in the terminal attribute table (processing 2, corresponding to at step S102 of FIG. 6), and sends a call setting message M5 for receiving purposes to the interface 15 in the channel under communication.

The switching system 1 continues to monitor whether there is a response from the interface 15.

If there is no response from the called terminal, the switching system 1 checks the terminal attributes of the terminal A under communication stored in the terminal attribute table in processing 1b for the terminal attributes of the terminal D stored in the terminal attribute table in processing 2. In this case, the switching system 1 confirms the same terminal attributes (processing 3, corresponding to the flow including steps S108, S109, S110 of FIG. 6).

At this time, the switching system 1 sends a disconnection message M6 with a reason indicative of "busy state" to the terminal D of the network 2. Thus, the terminal D recognizes that the called party is busy for the reason indicated in the received message M6.

Therefore, the calling terminal D will be able to communicate with the called terminal by re-dialing later when an ISDN terminal having the same attributes as the terminal D becomes idle.

The answering machine may send to the terminal D a voice signal corresponding to the message M6 simultaneously with the sending of the message M6 to the terminal D.

As described above, according to the present invention, when there is an outgoing call to or an incoming call from a terminal for the extension-side ISDN interface, the terminal attributes of the calling terminal are extracted from the call setting message and stored in the terminal attribute table. The attribute of the terminal under communication is then controlled by the extension-side ISDN interface. When no terminal responds to a new incoming call on a channel of this interface and the calling terminal is informed of a reason for disconnection, a message indicating the disconnection reason is created on the basis of the result of checking the terminal attributes of the calling terminal for against those in the terminal attribute table. Therefore, the calling terminal can be informed of the correct disconnection reason. Especially, abandonment of communication is avoided on the basis of an incorrect reason for disconnection (non-coincidence of attributes) performed when the incoming call cannot be responded because a terminal having the same attributes as the calling terminal is busy. According to this method, the reliability of the communication is improved.

What is claimed is:

1. An electronic switching system comprising:
   an ISDN interface accommodating a plurality of ISDN terminals provided at an extension side of the switching system and including a plurality of channels;
   means for extracting an attribute of a first originating terminal originating a call when a first ISDN terminal originates or receives the call using one of the plurality of channels of the ISDN interface;
   means for storing the attribute of the first ISDN terminal corresponding to a used channel when the first ISDN terminal is engaged in communications with another party following the originating or receiving of the call;
   means for determining whether any of the terminals accommodated by the ISDN interface can respond to and be connected to an incoming call originated by a second originating terminal through an office line;
   means for creating a disconnection reason message for notifying the second originating terminal to discontinue calling based on the attribute of the second originating terminal and the attributes of terminals engaged in communications stored in the storing means, when the determining means determines that none of the terminals accommodated in the ISDN interface can respond and be connected to the call originated by the second originating terminal through the office line; and means for informing the second originating terminal of the disconnection reason message created by the disconnection reason creating means.

2. An electronic switching system according to claim 1, wherein the determining means determines that a terminal accommodated by the ISDN interface cannot respond and be connected to the call by the second originating terminal when at least one of the following occurs: 1) there is no response to the originated call from the terminal accommodated in the ISDN interface for a predetermined interval of time and 2) the terminal accommodated by the ISDN interface informs the determining means that the attributes of the second originating terminal and the terminal accommodated by the ISDN interface do not coincide with each other.

3. An electronic switching system according to claim 1, wherein the disconnection reason creating means creates a disconnection reason message indicating that the terminal accommodated by the ISDN interface is busy when the determining means determines that the terminal accommodated by the ISDN interface does not respond to the call by the second originating terminal and the attribute of the terminal stored in the terminal attribute storing means coincides with the attribute of the second originating terminal.

4. An electronic switching system according to claim 1, wherein the terminal attribute extracting means extracts the attribute of a terminal accommodated in the ISDN interface from data on lower or higher layer matching characteristics in a call setting message transmitted from the terminal when the terminal originates or receives a call.

5. An electronic switching system according to claim 1, further comprising means for erasing the attribute of a terminal stored in the attribute storing means when the terminal ends the communication.

6. An electronic switching system according to claim 1, wherein the disconnection reason informing means comprises an answering machine for communicating the disconnection reason created by the disconnection reason creating means to the second originating terminal by a voice message.

7. A method of setting a disconnection reason in an electronic switching system including an ISDN interface accommodating a plurality of ISDN terminals provided at an extension side of the switching system and having a plurality of channels, comprising the steps of:

extracting an attribute of a first originating terminal originating a call when a first ISDN terminal accommodated by the ISDN interface originates or receives the call using one of the plurality of channels of the ISDN interface;

storing the attribute of the first ISDN terminal corresponding to the used channel when the first ISDN terminal is engaged in communications with another party after the originating or receiving of the call;

determining whether any of the terminals accommodated in the ISDN interface can respond to and be connected to an incoming call originated by a second originating terminal through an office line;

creating a disconnection reason message for notifying the second originating terminal to discontinue calling based on the attribute of the second originating terminal and the stored attributes of terminals engaged in communications when the determining step determines that none of the ISDN terminals accommodated by the ISDN interface can respond to and be connected to the call by the second originating terminal; and informing the second originating terminal of the disconnection reason message created by the disconnection reason creating steps.

8. A method according to claim 7, wherein the determining step includes the step of determining that a terminal accommodated by the ISDN interface cannot respond and be connected to the call by the second originating terminal when at least one of the following occurs: 1) there is no response to the originating call from the terminal accommodated by the ISDN interface for a predetermined interval of time and 2) the terminal accommodated by the ISDN interface determines that the attributes of the second originating terminal and the terminal accommodated by the ISDN interface do not coincide with each other.

9. A method according to claim 8, wherein the disconnection reason message creating step includes the step of creating a disconnection reason message indicating that a terminal accommodated in the ISDN interface is busy when the determining step determines that the ISDN terminal does not respond to the call by the second originating terminal and the attribute stored by the terminal attribute storing step coincides with the attribute of the second originating terminal.

10. A method according to claim 9, wherein the terminal attribute extracting step includes the step of performing extraction of the attribute of a terminal engaged in communications with another party from data on lower or higher layer matching characteristics in a call setting message transmitted from the terminal when the terminal originates or receives a call.

11. A method according to claim 7, further comprising the step of erasing the attribute of a terminal engaged in communications with another party stored by the attribute storing step when the terminal ends the communication.

* * * * *